US006320534B1

(12) United States Patent
Goss

(10) Patent No.: US 6,320,534 B1
(45) Date of Patent: Nov. 20, 2001

(54) LOCATION BASED PERSONAL TELEPHONE ROUTING SYSTEM

(75) Inventor: Stephen C. Goss, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/382,419

(22) Filed: Aug. 24, 1999

(51) Int. Cl.[7] .................................................. H04M 3/54
(52) U.S. Cl. .................... 342/357.1; 379/211; 455/445; 455/456
(58) Field of Search .................... 379/258, 156, 379/157, 164, 165, 200, 210, 211, 212; 342/357.1; 455/445, 456, 457

(56) References Cited

U.S. PATENT DOCUMENTS

| | | | |
|---|---|---|---|
| 3,739,329 | * 6/1973 | Lester | 367/6 |
| 4,209,787 | * 6/1980 | Freeny, Jr. | 342/457 |
| 4,752,951 | * 6/1988 | Konneker | 379/211 |
| 5,062,151 | * 10/1991 | Shipley | 359/154 |
| 5,155,761 | * 10/1992 | Hammond | 379/88.2 |
| 5,243,645 | * 9/1993 | Bissell et al. | 379/211 |
| 5,428,663 | * 6/1995 | Grimes et al. | 455/31.2 |
| 5,548,637 | * 8/1996 | Heller et al. | 379/201 |
| 5,847,679 | * 12/1998 | Tee et al. | 342/357.07 |
| 6,009,333 | * 12/1999 | Chaco | 455/456 |
| 6,021,180 | * 2/2000 | Kass | 379/88.01 |
| 6,049,718 | * 4/2000 | Stewart | 455/456 |
| 6,138,008 | * 10/2000 | Dunn et al. | 455/414 |

FOREIGN PATENT DOCUMENTS

2172564 * 10/1996 (CA) .............................. H04M/3/54

OTHER PUBLICATIONS

Designing a positioning system for finding things and people indoors, Werb, J.; Lanzl, C., IEEE Spectrum, vol.: 35 Issue: 9, pp.: 71–78, Sep. 1998.*

* cited by examiner

Primary Examiner—Thomas H. Tarcza
Assistant Examiner—Fred H Mull
(74) Attorney, Agent, or Firm—Fay, Sharpe, Fagan, Minnich & McKee, LLP

(57) ABSTRACT

A location-based personal telephone routing system is responsive to a subscriber's location for routing incoming calls to a telephone near the subscriber. A program-controlled processor within the system interrogates a location determining device after receiving a call directed to the subscriber. The location determining device replies to the interrogation with a message including location information that the processor uses to dip into a database listing telephone numbers and corresponding locations of telephones specified by the subscriber. If no subscriber-listed telephones are near the location received, the system then dips into an area-wide database to compare the location received to the stored locations of a large number of telephones in a geographic area. Upon determining the telephone closest to the subscriber, the processor then routes the incoming call to the determined telephone and alerts the subscriber through distinctive ringing.

14 Claims, 5 Drawing Sheets

LOCATION BASED PERSONAL TELEPHONE ROUTING SYSTEM

BACKGROUND OF THE INVENTION

The present invention relates to the field of wireless and wireline telephony. It finds particular application in conjunction with automatically routing incoming telephone calls to a subscriber based primarily on the subscriber's location, and will be described with reference thereto.

Telephone call routing systems are known that sequence through a list of subscriber-specified telephone numbers in response to receiving an incoming call. Typically, these systems operate by providing subscribers a new telephone number, hereafter referred to as a 'reach number'. Each subscriber conveys his reach number to callers as his only telephone number. When a call is directed to a subscriber's reach number, telephone equipment routes the call to pre-stored, subscriber-specified telephone numbers. As an example, if a subscriber lists in order, a home phone, an office phone, a mobile phone, and a pager, the system will ring the telephone numbers in the order predetermined by the subscriber for a number of rings. The subscriber can also manually interact with this system in order to change the sequencing order of the listed telephone numbers or manage the list by adding and deleting numbers.

Unfortunately, such systems are only as dependable as the subscribers are diligent in maintaining their personal telephone number lists. In addition, if a subscriber is away from all the telephones on his list, he will not receive calls since such systems sequence only through subscriber-supplied telephone numbers. Moreover, each subscriber is typically allowed to specify only a small number of telephone numbers on his list. And, of course, a subscriber can list only those telephone numbers that he knows.

Other systems are known for locating and directing calls to people inside of larger structures with a number of telephones. Typically a caller calls a central number and interacts with a live or automated operator to identify the desired called party. Such systems are described in U.S. Pat. Nos. 5,548,637; 5,155,761; 5,062,151. These systems undesirably only work within the building and with building telephone equipment.

BRIEF SUMMARY OF THE INVENTION

The above problems are alleviated and an advance is made over the prior art in accordance with the teachings of the applicant's invention, wherein a method is described for routing a telephone call to a subscriber based on the subscriber's location. The method includes paging a location determining device preferably on the subscriber's person and, in response to the page, receiving location information from the location determining device. A nearby telephone is selected from a database based on physical proximity of the telephone and the location received from the location determining device. The call is then routed to the telephone selected.

In accordance with another aspect of the present invention, the paging step includes formatting an interrogation message and then transmitting the message over a wireless network covering a large geographical area. The wireless network could be a standalone system or integrated into an existing wireless telephony system.

In accordance with another aspect of the present invention, in response to receipt of the interrogation message by the location determining device, the location of the device is determined and a response message is prepared which includes the location information. This response message is then returned over the wireless network.

In accordance with another aspect of the present invention, the location of the location determining device is determined by calculating a position from Global Positioning System (GPS), Local Positioning System (LPS) or acceleration signals. It is recognized that other methods of determining position may be used with equal functionality.

In accordance with another aspect of the present invention, the database includes the telephone numbers and locations of a plurality of telephones selected and/or supplied by the subscriber. The location information received from the location determining device is then compared with the location associated with each of the plurality of telephones on the subscriber's list. Based on the comparison, if one of the telephones on the subscriber's list is within a specified distance to the location received, that telephone becomes the selected telephone to which the call will be routed.

In accordance with another aspect of the present invention, the location information received from the location determining device is announced to the party originating the call.

In accordance with another aspect of the present invention, the method further comprises, for a telephone designated as mobile, periodically interrogating the mobile telephone for a location update. In response to receipt of the location update, the location associated with the mobile phone is updated in the database.

In accordance with another embodiment of the present invention, a call routing system for routing a telephone call to a preferred telephone selected for meeting proximity criterion includes a processor controlling a telephone switching system. A location determining system and a storage device containing associations of telephone numbers and the locations of the corresponding telephones is in communication with the processor. The call routing system recognizes an incoming call to a subscriber and, through the location determining system, determines the location of the subscriber. From the storage device, the processor selects a telephone number corresponding to a telephone located within a specified distance to the location determined by the location determining system and directs the switching system to connect the incoming call to the telephone number selected.

In accordance with another aspect of the present invention, the location determining system further includes a wireless communication network which communicates messages between the processor and the location determining device associated with the subscriber.

In accordance with another aspect of the present invention, the location determining system alternately includes a location calculating circuit adapted to receive signals from one or more of the following: a Global Positioning System, a Local Positioning System, and an accelerometer. The circuit calculates the location of the location determining device based on the signals received.

In accordance with another aspect of the present invention, the storage device includes memory fields for storing telephone numbers and corresponding location information for a plurality of telephones specified by the subscriber.

In accordance with another aspect of the present invention, the memory fields alternately include a static location field or a dynamic location field to store location information for fixed telephones or mobile telephones, respectively.

In accordance with another aspect of the present invention, the system further includes a database containing telephone numbers and corresponding locations of a plurality of telephones within an area. If none of the telephones on the subscriber-specified list are available, the processor then selects from the database a telephone in the area within a specified distance to the location received from the location determining device.

BRIEF DESCRIPTION OF THE DRAWINGS

The invention may take physical form in certain parts and arrangements of parts, and in various steps and arrangements of steps. The drawings are only for purposes of illustrating the preferred embodiments and are not to be construed as limiting the invention.

DETAILED DESCRIPTION OF THE PREFERRED EMBODIMENTS

Figure 1:
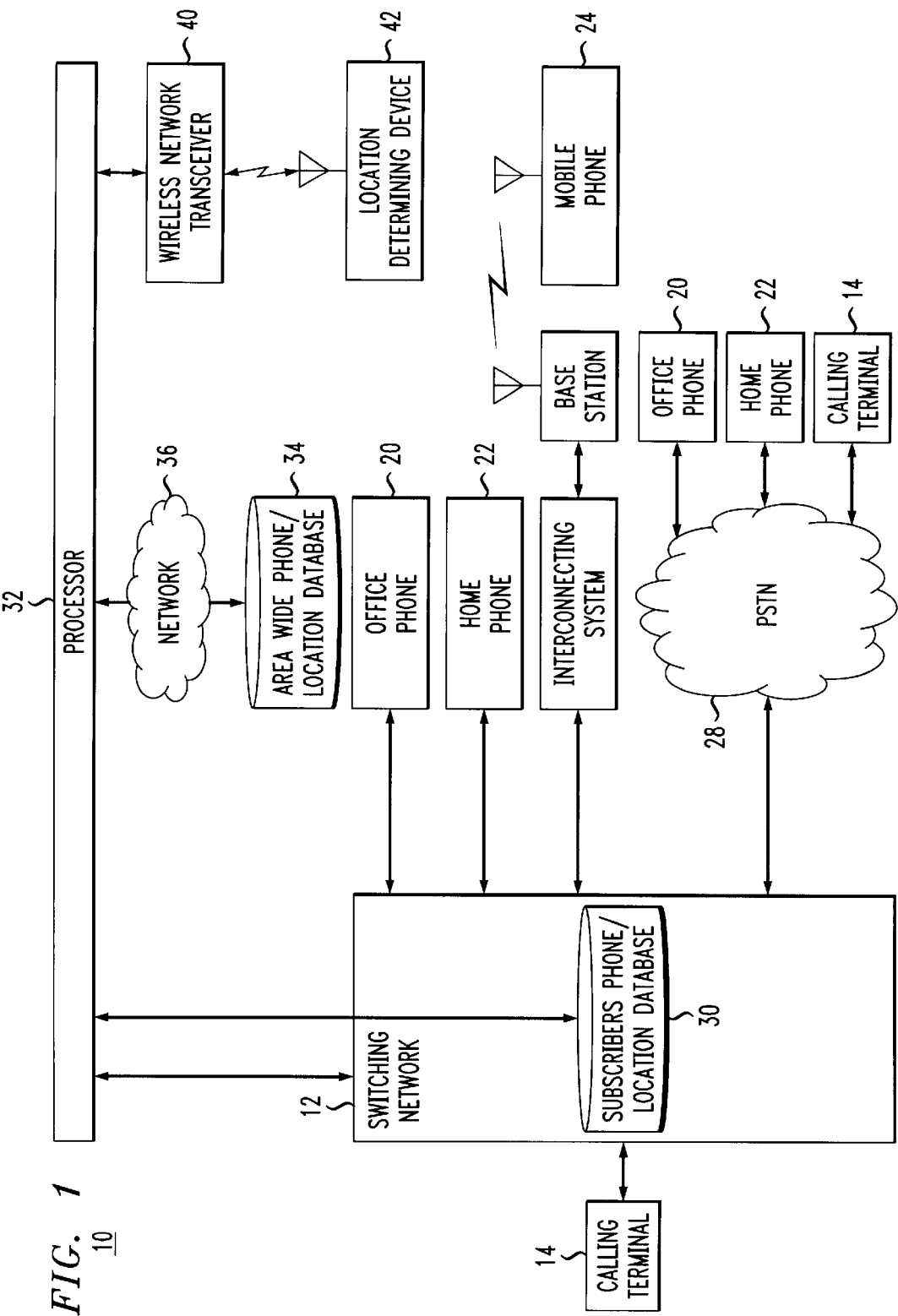
FIG. 1 is a simplified block diagram of the location based personal telephone routing system.

With reference to FIG. 1, a call routing system 10 includes a switching network 12 for connecting a calling terminal 14 to a telephone located within a specified distance of a location determining device 42 worn by a subscriber (not shown). The switching network 12 preferably comprises a 5ESS Switch® manufactured by Lucent Technologies, which is well known in the telephone industry. Those skilled in the art, will also appreciate that many calling terminals 14, hard wired telephones, and cellular type telephones are typically connected to the switch 12. Additionally, a subscriber's telephones, that is, office telephone 20, home telephone 22, and mobile telephone 24 may be connected via a direct line or trunk, through a public switched telephone network 28, or through other interconnection networks.

The system 10 also includes a database 30 which stores a subscriber's reach number along with a corresponding list of subscriber-supplied telephone numbers with associated locations. Preferably, database 30 is local to the switching network 12 for quick access by a controller or processor 32. A remote database 34 also is accessible by processor 32 through a network 36 and is preferably used for storing data that is shared by a plurality of switches. Remote database 34 includes telephone numbers and associated physical locations of telephones located over a wide geographic area. In some applications, it may be advantageous to include the subscriber reach numbers and subscriber-supplied telephone information in the remote database as well. The operation and access of these databases 30, 34 will be more fully described below.

The system 10 preferably includes an active location determining system operating over a wireless network connected to and controlled by processor 32. The wireless network includes one or more wireless network transceivers 40 in communication with a plurality of subscriber location determining devices 42. The location determining device 42 interacts with or determines position from either a Global Positioning System (GPS) or a Local Positioning System (LPS) as is known in the art. For example, the GPS variant may use a location determining device 42 as described in U.S. Pat. No. 5,847,679. The LPS variant may use a system described in "The Practical Engineer, Designing a Positioning System For Finding Things and People Indoors", IEEE Spectrum, 71–78, September 1998. Moreover, location determining device 42 preferably comprises both GPS and LPS capabilities, as each is preferable in different operating environments, as discussed in the above mentioned references. The present invention also recognizes that passive tracking systems (as opposed to the active systems described) could also be employed without departing from the scope of the invention.

Figure 2:
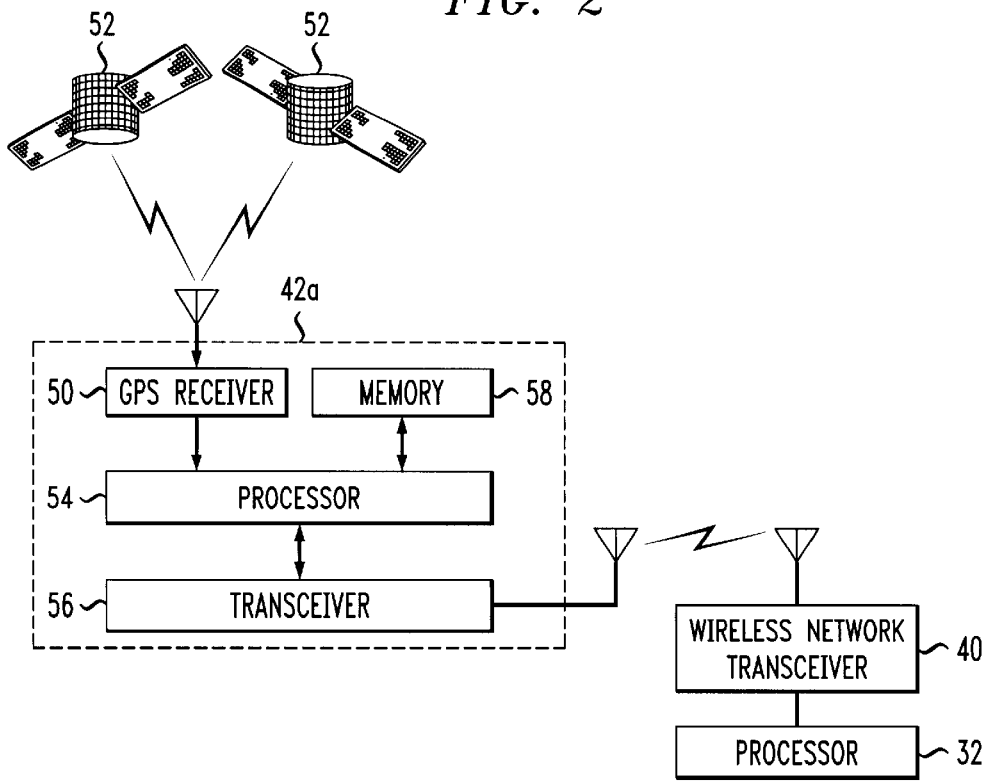
FIGS. 2, 3 and 4 are alternate embodiments of location determining devices suitable to practice the present invention.
Figure 3:
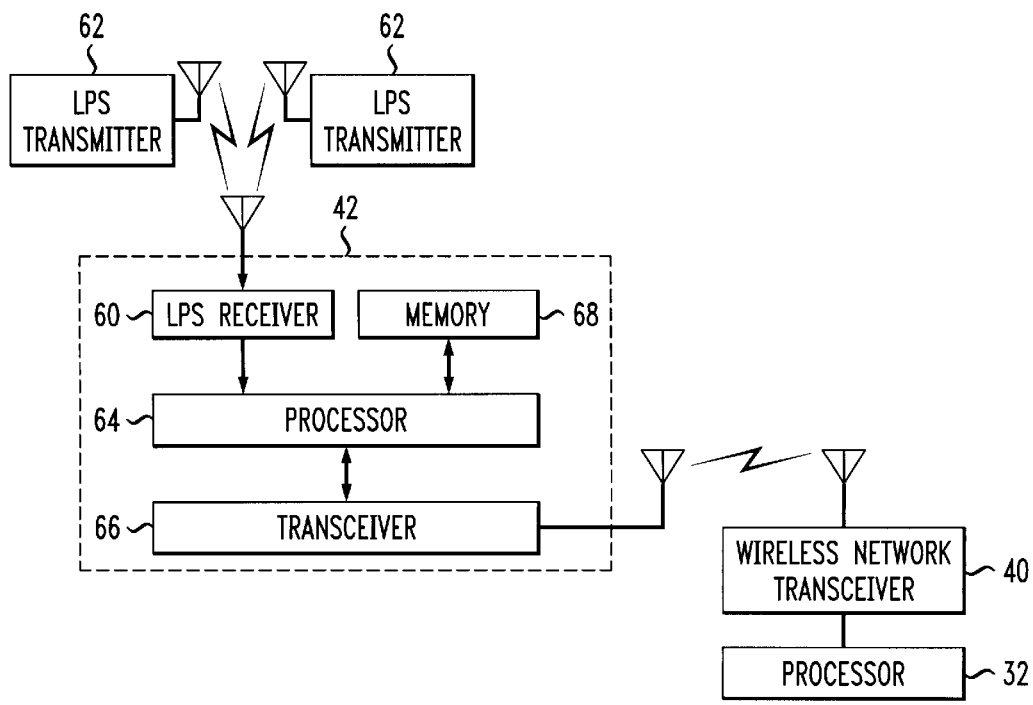
Figure 4:
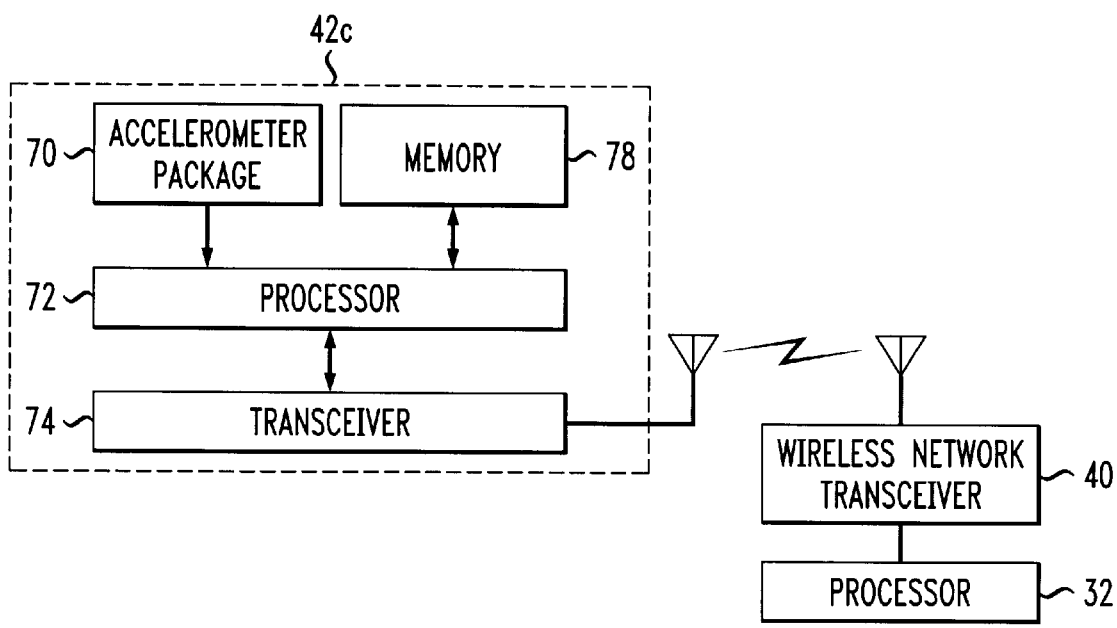

With reference now to FIGS. 2, 3, and 4, location determining device 42 is illustrated in three different embodiments. To illustrate the distinction between embodiments of the location determining device 42, an alphabetic subscript is used, for example $42_a$ as seen in FIG. 2. Continued reference to FIG. 2 shows the GPS variant of the device $42_a$. The GPS receiver 50 receives signals from the constellation of GPS satellites 52. As is known in the art, a processor 54 in the location determining device 42 processes the signals from the receiver 50 to determine location information. The location is then stored in memory 58. When the routing system 10 (FIG. 1) receives a telephone call, the processor 32 directs the wireless network transceiver 40 to transmit a position interrogation directed to the location determining device $42_a$. This signal enters the device $42_a$ through a transceiver 56 which passes the interrogation to the processor 54. In response to the interrogation, the processor 54 formats a response message including the most current location information available and transmits the response back over the wireless network to the routing system 10.

With reference now to FIG. 3, the location determining device $42_b$ associated with the LPS variant is shown. In an LPS environment, such as within a building, the LPS receiver 60 periodically receives LPS signals from transmitters 62 dispersed over or within a defined area such as the building. The signals received are processed by the processor 64 and location information is determined and stored in memory 68. Responsive to receiving the interrogation request through the transceivers 40, 66, processor 64 prepares a response including the latest location information calculated and transmits the response through the transceiver 66 over the wireless network to the routing system 10.

Referring now to FIG. 4, the location determining device $42_c$ calculates position via an accelerometer package 70. Preferably the accelerometer package 70 comprises microelectromechanical systems (MEMS) capable of sensing acceleration in three dimensions. Processor 72 calculates from the accelerometer signals a position offset from an initial reference position to determine current location information which is then stored in memory 78. On receipt of the interrogation through transceivers 40, 74, the processor 72 prepares the response including the location information and transmits the response through transceiver 74, over the wireless network to the routing system 10.

Those skilled in the art will realize that while the embodiments illustrated in FIGS. 2, 3, and 4 show separate location determining devices $42_a$, $42_b$, and $42_c$ it is to be appreciated that multiple location determining systems are possible in any one location determining device 42. Moreover, location determining devices 42 may include a stand alone device worn by a subscriber, or alternately include added circuitry in existing mobile electronics, such as pagers, cellular telephones, traditional telephones, portable organizers and the like.

Figure 5:
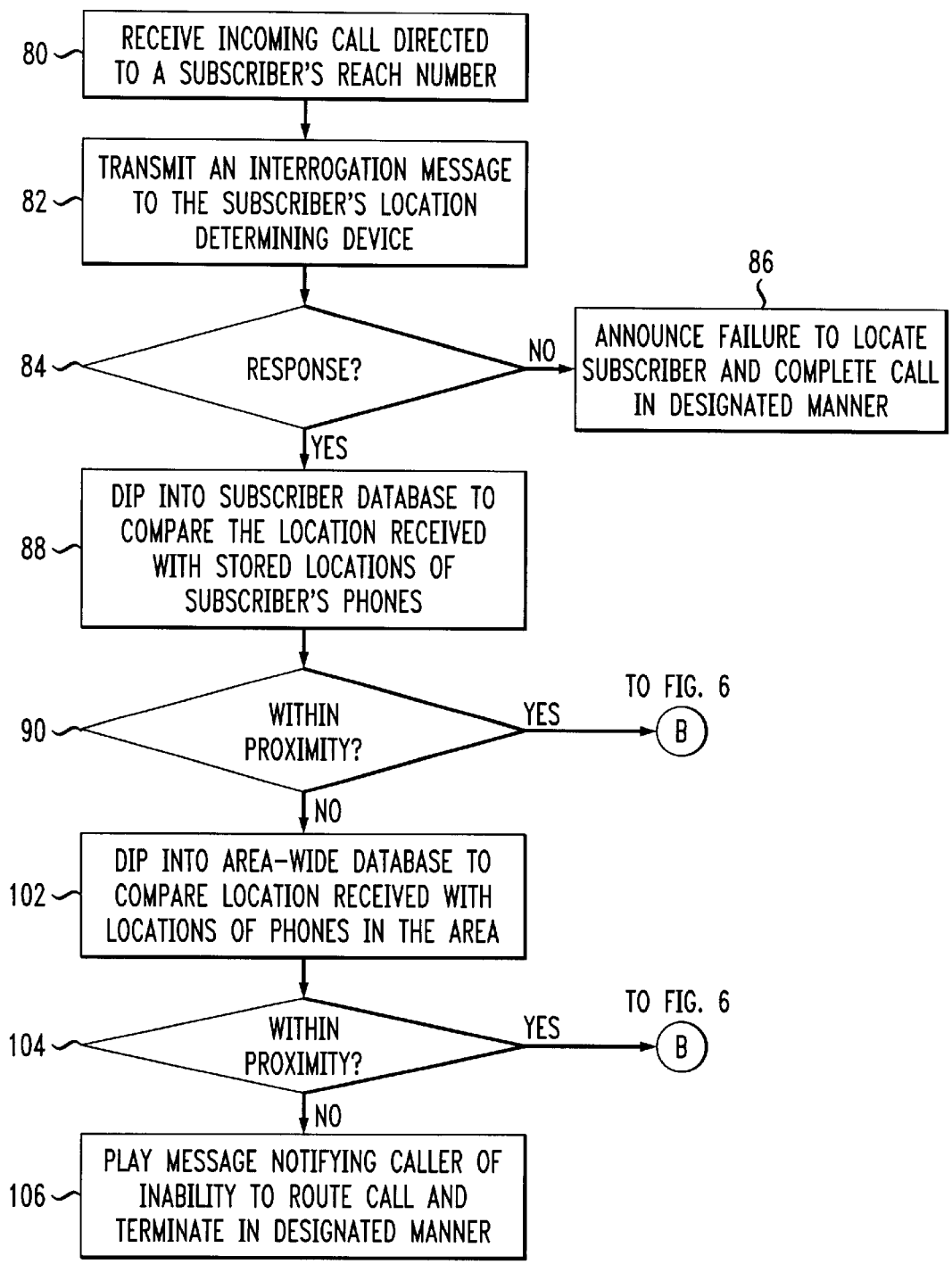
FIG. 5 is a flow diagram illustrating the process used by the call routing system of FIG. 1 to route an incoming call.

With reference now to FIG. 5 the process implemented in the system 10 is illustrated. First, an incoming call is received by the switching network 12 in step 80. The processor 32 recognizes that the incoming call is directed to a subscriber's reach number, preferably by attributes of the telephone number called. The processor 32 then directs the wireless network transceiver 40 to transmit an interrogation message over a wide area for receipt by the subscriber's location determining device 42 in step 82. The processor then waits for a response from the location determining device 42. If a response is not received, as determined in decision block 84, the processor is unable to determine the location of the location determining device 42, and hence the subscriber. Preferably, the call is then completed to a telephone number designated by the subscriber, to a voice mail or messaging system, or to a caller determined option in step 86.

Still referring to FIG. 5, if a response from the location determining device 42 is detected in decision block 84, the process proceeds to block 88 where the processor 32 dips into the local database 30 and compares the location information received with the locations of the subscriber-specified telephones. If one of the subscriber-specified telephones 20, 22, 24 (from FIG. 1) is within a specified proximity to the location received, as determined by decision block 90, the process proceeds through connector B to FIG. 6. Preferably, the specified proximity will be within hearing range of the subscriber with such range determined by the service provider or the subscriber personally. Moreover, the present invention appreciates that an appropriate proximity may vary with the subscriber's location and/or the particular telephone under consideration. For example, the proximity required for a mobile telephone may be closer than that required by a home telephone.

Figure 6:
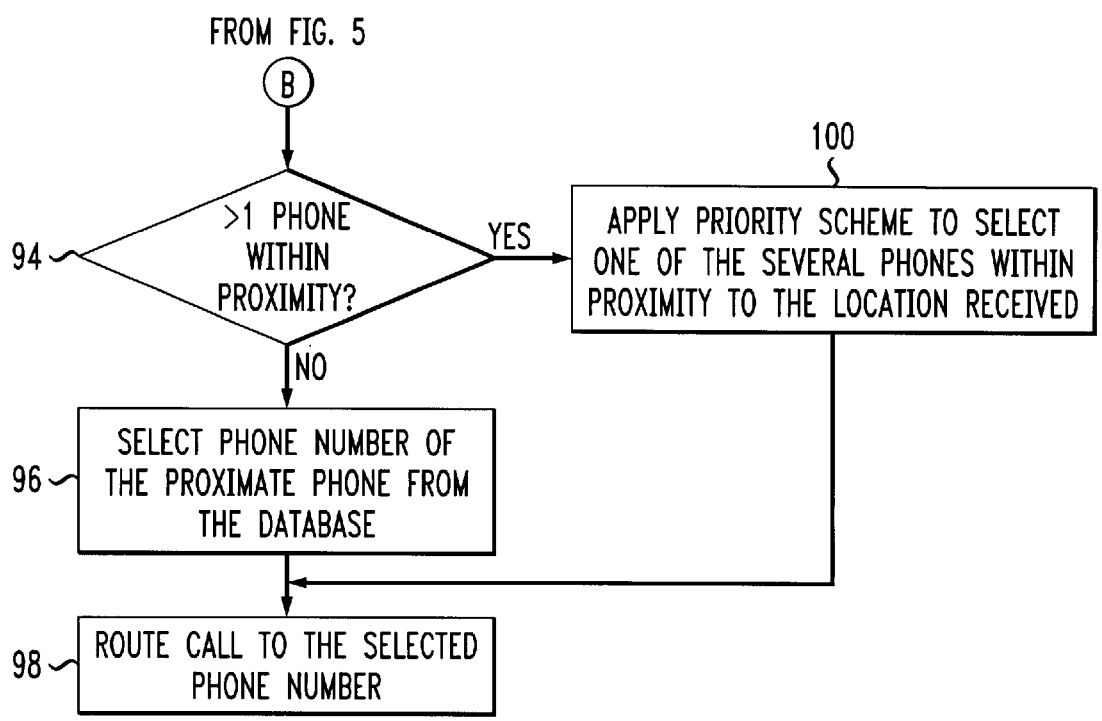
FIG. 6 is a continuation of the flow diagram of FIG. 5.

In FIG. 6, the process proceeds to decision block 94 where the processor 32 determines if more than one telephone is within the specified proximity. If not, the processor 32 controls the switching network 12 to select the one telephone from the subscriber's list within the proximity in block 96 and route the call as shown in step 98. On the other hand, if more than one telephone is within the specified proximity, the process proceeds to block 100 where the processor 32 resolves the ambiguity by applying a priority scheme, preferably specified by the subscriber or service provider. For example, the subscriber may be at home with her cellular telephone. If the subscriber is within the proximity of both her home telephone 22 and her cellular telephone 24, the system has an ambiguity as to which telephone to ring. In this event, a priority scheme, preferably determined in advance by the subscriber, is used to resolve the ambiguity. In the example case, the subscriber may have prioritized her home phone over her cellular phone which would result in the processor 32 selecting her home telephone as determined by step 100, and then routing the incoming call to that phone in step 98.

Referring back to FIG. 5, in the event that none of the subscriber's telephones are near the location received, as determined in decision block 90, the processor then dips into a second database 34 containing the telephone numbers and locations of many, preferably all, of the telephones located within a wide area surrounding the location received, as illustrated by step 102. At decision block 104, processor 32 determines whether, based on the second dip, any telephones are within the specified distance of the location received. If so, the process moves through connector B to FIG. 6, which applies a priority scheme and routes the call substantially as discussed above. Since the selected telephone is not on the subscriber's list, preferably distinctive ringing is used to alert the subscriber.

Alternatively, if decision block 104 fails to find any phones near the location received, the processor 32, plays a message notifying the caller of the inability to route the call and then gives the caller optional treatment, as indicated by step 106. The options preferably include terminating the call, attempting to contact another reach number, attempting to contact a non-reach number (i.e. a conventional number), routing the caller to a messaging system associated with the subscriber, or announcing to the caller the location received, preferably in an easy to understand manner, for example by name of a city or town, or by a determinable geographic location, i.e. "at the baseball park", or "at the corner of $8^{th}$ and Eye Streets". The present invention also recognizes the desirability of providing an easy to understand location to callers at other times during a call. For example, the location information received can be announced to the caller before connecting the call.

To ensure that database 30 maintains proper position information, especially with respect to mobile telephones, the system 10 periodically interrogates location determining devices 42 integral to or associated with telephones in the network. These integrated location determining devices 42 reply to the interrogations with their locations as discussed above, which the processor 32 uses to update its databases 30, 34. The present invention preferably envisions databases 30, 34 to contain the telephone numbers and locations of all telephones within the network including those telephones with integrated location determining devices 42. In order to minimize the number of location interrogations on fixed telephones (such as some office or home telephone systems) additional fields in the database would distinguish between mobile telephones requiring more frequent location updates than non-mobile telephones.

The invention has been described with reference to the preferred embodiments. Modifications and alterations will occur to others upon reading and understanding the preceding detailed description. It is intended that the invention be construed as including all such modifications and alterations insofar as they come within the scope of the appended claims or the equivalents a thereof.

Having thus described the preferred embodiments, the invention is now claimed to be:

1. A method for routing a telephone call to a subscriber based on a location associated with said subscriber comprising:

receiving a call directed to said subscriber;

paging a location determining device associated with said subscriber, receiving location information from said location determining device;

comparing the location information received with a corresponding location of each of a plurality of telephones selected by said subscriber;

based on the comparing, selecting a one of the subscriber selected telephones within a specified range of the received location information; and routing said call to the telephone selected.

2. The method for routing telephone calls as set forth in claim 1, wherein the paging step comprises:

formatting an interrogation message; and transmitting the interrogation message to said location determining device over a wireless network.

3. The method for routing telephone calls as set forth in claim 2, further comprising responsive to receipt of the interrogation message by the location determining device:

determining location information of said location determining device;

preparing a response including said location information; and transmitting said response over said network.

4. The method for routing telephone calls as set forth in claim 3, wherein the determining location information step comprises:

receiving Global Positioning System (GPS) signals; and calculating a position based on said signals received.

5. The method for routing telephone calls as set forth in claim 3, wherein the determining location information step comprises:

receiving Local Positioning System (LPS) signals; and calculating a position based on said signals received.

6. The method for routing telephone calls as set forth in claim 3, wherein the determining location information step comprises:

sensing acceleration signals in a direction; and calculating a position based on said acceleration signals sensed.

7. The method for routing telephone calls as set forth in claim 1, wherein the plurality of telephones includes telephone numbers and corresponding locations of a plurality of telephones selected by said subscriber, the selecting step comprising:

comparing the location information received with the corresponding location of each of said plurality of telephones selected by said subscriber;

based on the comparing, selecting a one of the telephones within a specified distance to the location information received.

8. The method for routing telephone calls as set forth in claim 1, further comprising, if no subscriber selected telephones are within the specified range:

comparing the location information received to locations of a plurality of non-subscriber selected telephones within an area; and, selecting one of the plurality of non-subscriber selected telephones within a specified range of the location information received.

9. The method for routing a telephone call as set forth in claim 1, further comprising:

announcing a location based on the received location information to a party originating the call.

10. A method for routing a call based on location comprising:

receiving a call directed to a subscriber;

receiving location information from a location determining device associated with the subscriber interrogated in response to receipt of the call;

at selected intervals, interrogating a location determining device associated with a telephone for a location update;

in response to receipt of the location update, updating a location associated with the telephone;

comparing the received location information from the location determining device associated with the subscriber with the location associated with the telephone; and based on the comparison, routing the call to the telephone.

11. A system for routing a telephone call to a preferred telephone selected for meeting conditions including proximity to a subscriber, the system comprising:

a processor;

a telephone switching system which receives and routes said telephone call, said telephone switching system being controlled by said processor;

a storage device containing subscriber selected telephone numbers and a location for each corresponding telephone, said storage device being in communication with said processor and containing a telephone number field for storing telephone numbers and a telephone location field for storing location information corresponding to each subscriber selected telephone, selected telephone location fields comprising a dynamically updatable telephone location field for storing periodically updated telephone location information; and, a location determining system in operable communication with said processor, which receives subscriber location information;

wherein said processor routes the telephone call to a telephone number based on said telephone location field and subscriber location information.

12. The system as set forth in claim 11 where the location determining system comprises:

a wireless communication network which communicates messages between a location determining device and said processor.

13. The system as set forth in claim 12 where said location determining device comprises:

a location calculating processor which receives signals from an item selected from the set of: a global positioning system, a local positioning system and an accelerometer, said processor calculating location information from said signals received.

14. A system for routing a telephone call comprising:

a processor;

a switching system which routes said telephone call under control of the processor;

a first database accessible to the processor containing a subscriber selected telephone number and a corresponding location;

a second database containing data including telephone numbers and corresponding location information of a plurality of telephones within an area, wherein, if the subscriber selected telephone is unavailable, said processor selects a telephone number from the second database within a specified distance of received subscriber location information.

* * * * *